US012641089B2

(12) United States Patent
Jung

(10) Patent No.: US 12,641,089 B2
(45) Date of Patent: May 26, 2026

(54) METHOD OF PREVENTING VEHICLE CONTROLLER FROM BEING HACKED AND SYSTEM THEREOF

(71) Applicants:Hyundai Motor Company, Seoul (KR); Kia Corporation, Seoul (KR)

(72) Inventor: Ho Jin Jung, Bucheon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 442 days.

(21) Appl. No.: 18/181,197

(22) Filed: Mar. 9, 2023

(65) Prior Publication Data

US 2024/0021028 A1     Jan. 18, 2024

(30) Foreign Application Priority Data

Jul. 18, 2022     (KR) ........................ 10-2022-0088382

(51) Int. Cl.
| | |
|---|---|
| *H04L 9/40* | (2022.01) |
| *G06F 21/44* | (2013.01) |
| *G07C 5/08* | (2006.01) |
| *G07C 9/00* | (2020.01) |
| *H04L 12/40* | (2006.01) |
| *H04L 67/12* | (2022.01) |

(52) U.S. Cl.
CPC ............ *H04L 63/108* (2013.01); *G06F 21/44* (2013.01); *G07C 9/00309* (2013.01); *G07C*

*5/0808* (2013.01); *H04L 2012/40215* (2013.01); *H04L 2012/40273* (2013.01); *H04L 67/12* (2013.01)

(58) Field of Classification Search
CPC ................... H04L 63/108; H04L 67/12; H04L 2012/40215; H04L 2012/40273; H04L 12/40; H04L 63/1466; G06F 21/44; G07C 9/00309; G07C 5/0808
See application file for complete search history.

(56) References Cited

U.S. PATENT DOCUMENTS

| | | | | |
|---|---|---|---|---|
| 9,219,802 | B2 * | 12/2015 | Enosaki | .............. H04L 12/4625 |
| 9,460,567 | B2 * | 10/2016 | Huang | ................... H04L 9/0869 |
| 12,182,634 | B2 * | 12/2024 | Ghosh | ....................... G06F 9/52 |
| 2021/0358235 | A1 * | 11/2021 | Kwon | ..................... B60R 25/20 |

* cited by examiner

*Primary Examiner* — Lynn D Feild
*Assistant Examiner* — Kelah Janae McFarland-Barnes
(74) *Attorney, Agent, or Firm* — Fish & Richardson P.C.

(57) ABSTRACT
A method for preventing a vehicle controller from being hacked includes allowing the vehicle controller to transition from a lock state to an unlock state as a security access with a vehicle diagnostic device is completed, transmitting, by the vehicle controller, a session holding time to the vehicle diagnostic device in the unlock state, monitoring, by the vehicle controller, whether a request message is received from the vehicle diagnostic device every session holding time, and determining, by the vehicle controller, whether to transition from the unlock state to the lock state based on whether the request message is received.

8 Claims, 7 Drawing Sheets

| A_Data byte | Parameter Name | Cvt | Byte Value | Mnemonic |
|---|---|---|---|---|
| #1 | SecurityAccess Response SID | M | 67 | SAPR |
| #2 | sub-function=[securityAccessType] | M | 00~7F | LEV_SAT_SK |
| #3 | securityS3ServerTime = [securityS3ServerTime] | C | $00_{16}$ to $FF_{16}$ | SS3ST |
| #4 | securitySeed[] = [     seed#1 (high byte) | C | 0x00~0xFF | SECSEED_SEED1HB |
| | : | : | : | : |
| #n | seed#m (low byte) ] | C | 0x00~0xFF | SEEDmLB |
| | C:  The presence of this parameter depends on the securityAccessType parameter. It is mandatory to be present if the securityAccessType parameter indicates that the client wants to retrieve the seed from the server. | | | |

| Value | Description |
|---|---|
| $00_{16} \sim 7F_{16}$ | SeparationTime minimum($ST_{min}$) range: 0ms ~ 127ms. The units of $ST_{min}$ in the range $00_{16}$ - $7F_{16}$ [0 - 127] are absolute milliseconds [ms]. |
| $80_{16} \sim F0_{16}$ | Reserved. This range of values is reserved by this part of ISO 15765. |
| $F1_{16} \sim F9_{16}$ | SeparationTime minimum($ST_{min}$) range: 100 μs ~ 900 μs. The units of $ST_{min}$ in the range $F1_{16}$ - $F9_{16}$ are even multiples of 100 μs, where parameter value $F1_{16}$ represents 100 μs and parameter value $F9_{16}$ represents 900 μs. |
| $FA_{16} \sim FF_{16}$ | S3Server Timeout (maximum) range : 200ms ~ 700ms. The units of S3Server Timeout in the range $FA_{16}$ ~ $FF_{16}$ are even multiples of 100ms, Where parameter value $FA_{16}$ represents 200ms and parameter value $FF_{16}$ represents 700ms. |

FIG.5

METHOD OF PREVENTING VEHICLE CONTROLLER FROM BEING HACKED AND SYSTEM THEREOF

CROSS-REFERENCE TO RELATED APPLICATION

This application claims the benefit of priority to Korean Patent Application No. 10-2022-0088382, filed in the Korean Intellectual Property Office on Jul. 18, 2022, the entire contents of which are incorporated herein by reference.

TECHNICAL FIELD

The present disclosure relates to a technique for preventing session hijacking between a vehicle diagnostic device and a vehicle controller (e.g., an electronic control unit (ECU)).

BACKGROUND

Session hijacking, which is a kind of session interception, means that an attacker intercepts the active state between the client and the server, that is, the state in which the client is logged into the server. Hacking may also be done through session hijacking even in a vehicle.

For example, because the 'On-board diagnostics (OBD) Connector' provided in a vehicle is connected to the gateway in the vehicle, an attacker may access various ECUs in the vehicle through the gateway, so that it is possible to request diagnostic services from various ECUs. In this case, the diagnostic service includes functions for high privileges, such as forced driving, data read/write, reprogramming, and the like. When an attacker who succeeds in hijacking a session transmits a malicious control signal to an ECU, it may have fatal consequences for the ECU.

In order to safely provide such a diagnostic service, each ECU uses a security access scheme. That is, each ECU performs a security access procedure with a vehicle diagnostic device, and when the security access procedure is normally completed, each ECU transitions from a lock state to an unlock state. When a request message (e.g., a tester present (3E hex) message) is not received from the vehicle diagnostic device every time (a conventional session holding time) preset in the unlock state, each ECU transitions from the unlock state to the lock state.

Because the conventional session holding time (e.g., 5,000 ms) is a fairly long time and is also known information, when an attacker disconnects the vehicle diagnostic device from the 'OBD Connector' and then connects a hacking tool, the hacking tool may transmit a request message to the ECU within 5,000 ms. Accordingly, the ECU maintains the unlock state, and eventually the attacker succeeds in hijacking the session. Therefore, there is a need to provide a scheme of preventing such session hijacking.

SUMMARY

The present disclosure has been made to solve the above-mentioned problems.

An aspect of the present disclosure provides a method and system for preventing a vehicle controller from being hacked, which are capable of preventing a session with a vehicle diagnostic device from being hijacked by transitioning from a lock state to an unlock state when the security access with the vehicle diagnostic device is completed, transmitting a session holding time in the unlock state to the vehicle diagnostic device, monitoring whether a request message is received from the vehicle diagnostic device every session holding time, and determining whether to transition from the unlock state to the lock state based on whether the request message is received.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method of preventing a vehicle controller from being hacked includes allowing the vehicle controller to transition from a lock state to an unlock state as a security access with a vehicle diagnostic device is completed, transmitting, by the vehicle controller, a session holding time to the vehicle diagnostic device in the unlock state, monitoring, by the vehicle controller, whether a request message is received from the vehicle diagnostic device every session holding time, and determining, by the vehicle controller, whether to transition from the unlock state to the lock state based on whether the request message is received.

In some implementations, the session holding time in the unlock state may be set shorter than a session holding time used in the lock state.

In some implementations, the determining of whether to transition may include maintaining the unlock state when a request message is received from the vehicle diagnostic device every session holding time, and transitioning from the unlock state to the lock state when the request message is not received from the vehicle diagnostic device every session holding time.

In some implementations, the transmitting of the session holding time may include recording, by the vehicle controller, the session holding time in the unlock state in a message for approving a security access of the vehicle diagnostic device, and transmitting the message to the vehicle diagnostic device.

In some implementations, the vehicle controller may be connected to a gateway provided in a vehicle.

In some implementations, the vehicle diagnostic device may perform a security access procedure with the vehicle controller through an OBD connector provided in a vehicle.

According to another aspect of the present disclosure, a system for preventing a vehicle controller from being hacked includes a vehicle diagnostic device that receives a session holding time from the vehicle controller as a security access with the vehicle controller is completed, and transmits a request message to the vehicle controller every session holding time, and the vehicle controller that transitions from a lock state to an unlock state as a security access with the vehicle diagnostic device is completed, transmits the session holding time in the unlock state to the vehicle diagnostic device, monitors whether the request message is received from the vehicle diagnostic device every session holding time, and determines whether to transition from the unlock state to the lock state based on whether the request message is received.

In some implementations, the vehicle controller may maintain the unlock state when a request message is received from the vehicle diagnostic device every session holding time, and transition from the unlock state to the lock state when the request message is not received from the vehicle diagnostic device every session holding time.

In some implementations, the vehicle controller may record the session holding time in the unlock state in a message for approving a security access of the vehicle diagnostic device, and transmit the message to the vehicle diagnostic device.

BRIEF DESCRIPTION OF THE DRAWINGS

The above and other objects, features and advantages of the present disclosure will be more apparent from the following detailed description taken in conjunction with the accompanying drawings:

FIG. 4 is a diagram illustrating an example of information recorded in an approval message.

FIG. 5 is a diagram illustrating an example of a "STmin" value table.

DETAILED DESCRIPTION

Figure 1:
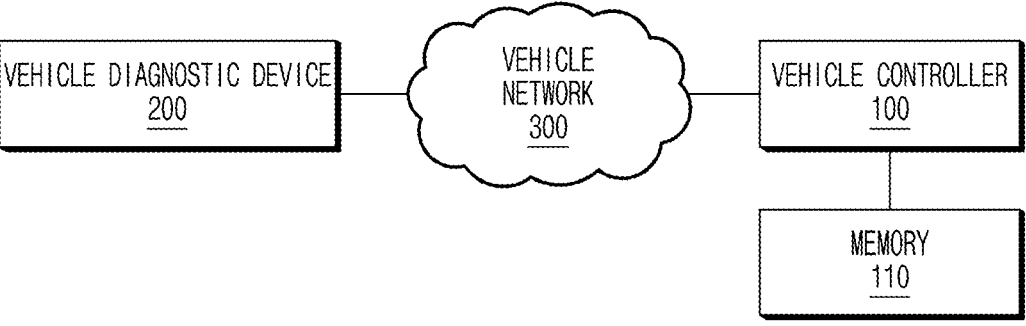
FIG. 1 is a diagram illustrating an example of a session hijacking prevention system.

FIG. 1 is a diagram illustrating an example of a session hijacking prevention system.

As shown in FIG. 1, a session hijacking prevention system may include a vehicle controller 100 and a vehicle diagnostic device 200.

Regarding each component, first, the vehicle controller 100 may be implemented in the form of hardware or software, or may be implemented in a combination of hardware and software. In some implementations, the vehicle controller 100 may be implemented as a microprocessor, but is not limited thereto.

Specifically, the vehicle controller 100 may transition from a lock state to an unlock state as a security access with the vehicle diagnostic device 200 is completed, transmit a session holding time to the vehicle diagnostic device 200 in the unlock state, monitor whether a request message (e.g., a tester present message) is received from the vehicle diagnostic device 200 every session holding time, and determine whether to transition from the unlock state to the lock state based on whether the request message is received, so that it is possible to prevent a session with the vehicle diagnostic device 200 from being hijacked. In some implementations, the session holding time in the unlock state (e.g. 200 ms) can be set to be less than the existing session holding time (5,000 ms).

In some implementations, the lock state of the vehicle controller 100 may refer to a state that does not respond to the request of the vehicle diagnostic device 200, and the unlock state of the vehicle controller 100 may refer to a state that responds to a request from the vehicle diagnostic device 200.

The vehicle controller 100, which is a generic term for various controllers provided in a vehicle, may include an electronic control unit (ECU), a motor control unit (MCU), an engine control unit (ECU), a transmission control unit (TCU), a battery management system (BMS), a tire pressure monitoring system (TPMS), an air bag control unit (ACU), an integrated body unit (IBU), an integrated control unit (ICU), and the like, which are connected with a gateway on the vehicle.

The controller may include a memory 110 for storing various logics, algorithms, and programs for the process of transitioning from a lock state to an unlock state as a security access with the vehicle diagnostic device 200 is completed, transmitting a session holding time to the vehicle diagnostic device 200 in the unlock state, monitoring whether a request message (e.g., a tester present message) is received from the vehicle diagnostic device 200 every session holding time, and determining whether to transition from the unlock state to the lock state based on whether the request message is received.

In some implementations, the memory 110 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

The vehicle diagnostic device 200 may perform a security access procedure with the vehicle controller 100 through an OBD connector provided in a vehicle, receive a new session holding time from the vehicle controller 100 when the security access procedure with the vehicle controller 100 is completed, and transmit the request message to the vehicle controller 100 every session holding time. In some implementations, when an attacker removes the vehicle diagnostic device 200 from the OBD connector and connects a hacking tool, because the hacking tool did not receive the new session holding time from the vehicle controller 100, the request message is transmitted to the vehicle controller 100 based on an existing session holding time (session holding time defined the conventional technologies). Accordingly, because the vehicle controller 100 does not receive the request message within the new session holding time, the vehicle controller 100 may transition from the unlock state to the lock state. Therefore, the session hijacking can be blocked.

In some implementations, a vehicle network 300 may include a gateway. The vehicle network 300 may include a controller area network (CAN), a controller area network with flexible data-rate (CAN FD), a local interconnect network (LIN), FlexRay, media oriented systems transport (MOST), an Ethernet, and the like.

Figure 2:
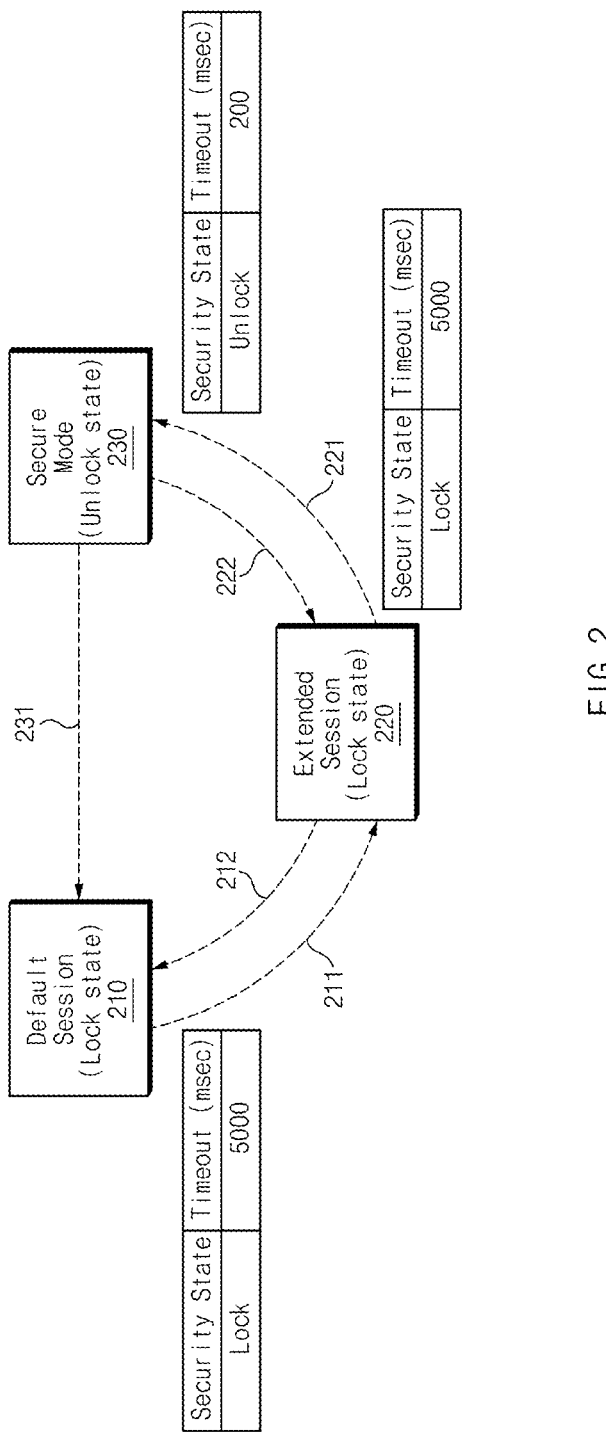
FIG. 2 is a diagram illustrating an example of the state transition of a vehicle controller.

FIG. 2 is a diagram illustrating an example of the state transition of a vehicle controller.

As shown in FIG. 2, the state of the vehicle controller 100 includes a default session 210 and an extended session 220, and a security mode 230.

Initially, the vehicle controller 100 maintains the default session 210 in which the security state is a lock state.

Thereafter, when the vehicle controller 100 receives a session transition request from the vehicle diagnostic device 200, in 211, the vehicle controller 100 transitions from the default session 210 to the extended session 220. In some implementations, in the extended session 220, the security state of the vehicle controller 100 remains the lock state.

Thereafter, the vehicle controller 100 may maintain the extended session 220 when receiving a request message every 5000 ms from the vehicle diagnostic device 200, otherwise transitions to the default session 210 in 212. In some implementations, when the vehicle controller 100 is reset or is requested to transition to the default session 210, the vehicle controller 100 transitions to the default session 210.

Thereafter, when the security access to the vehicle diagnostic device 200 is approved, in 221, the vehicle controller 100 transitions to the security mode 230 in the extended session 220. In some implementations, in the security mode 230, the security state of the vehicle controller 100 is an unlock state.

Thereafter, in 222, the vehicle controller 100 maintains the security mode 230 when receiving a request message every 200 ms from the vehicle diagnostic device 200, otherwise transitions to the extended session 220 in 222. In some implementations, when the vehicle controller 100 is reset or is requested to transition to the default session 210, in 231, the vehicle controller 100 transitions to the default session 210.

In the conventional technologies, the period at which the vehicle diagnostic device 200 transmits the request message is based on 5,000 ms, and the period is known as the session holding time defined in the conventional technologies, so that the vehicle controller 100 does not separately provide the period information to the vehicle diagnostic device 200.

To the contrary, the extended session 220 may use the session holding time defined in the conventional technologies, but at the time of approving the security access of the vehicle diagnostic device 200, the vehicle controller 100 can transmit a new session holding time (e.g., 200 ms) to the vehicle diagnostic device 200. Accordingly, the vehicle diagnostic device 200 can transmit a request message based on the new session holding time, and the vehicle controller 100 receives the request message every new session holding time in the security mode 230. In this case, the hacking tool that attempts to hijack the session does not receive the new session holding time, and the request message is transmitted based on the session holding time defined in the conventional technologies, so that the hacking tool may not receive the request message every new session holding time, thereby transitioning from the security mode 230 to the extended session 220. In this case, the extended session 220 is in the lock state of the security state, so that the attacker's session hijacking fails.

Figure 3:
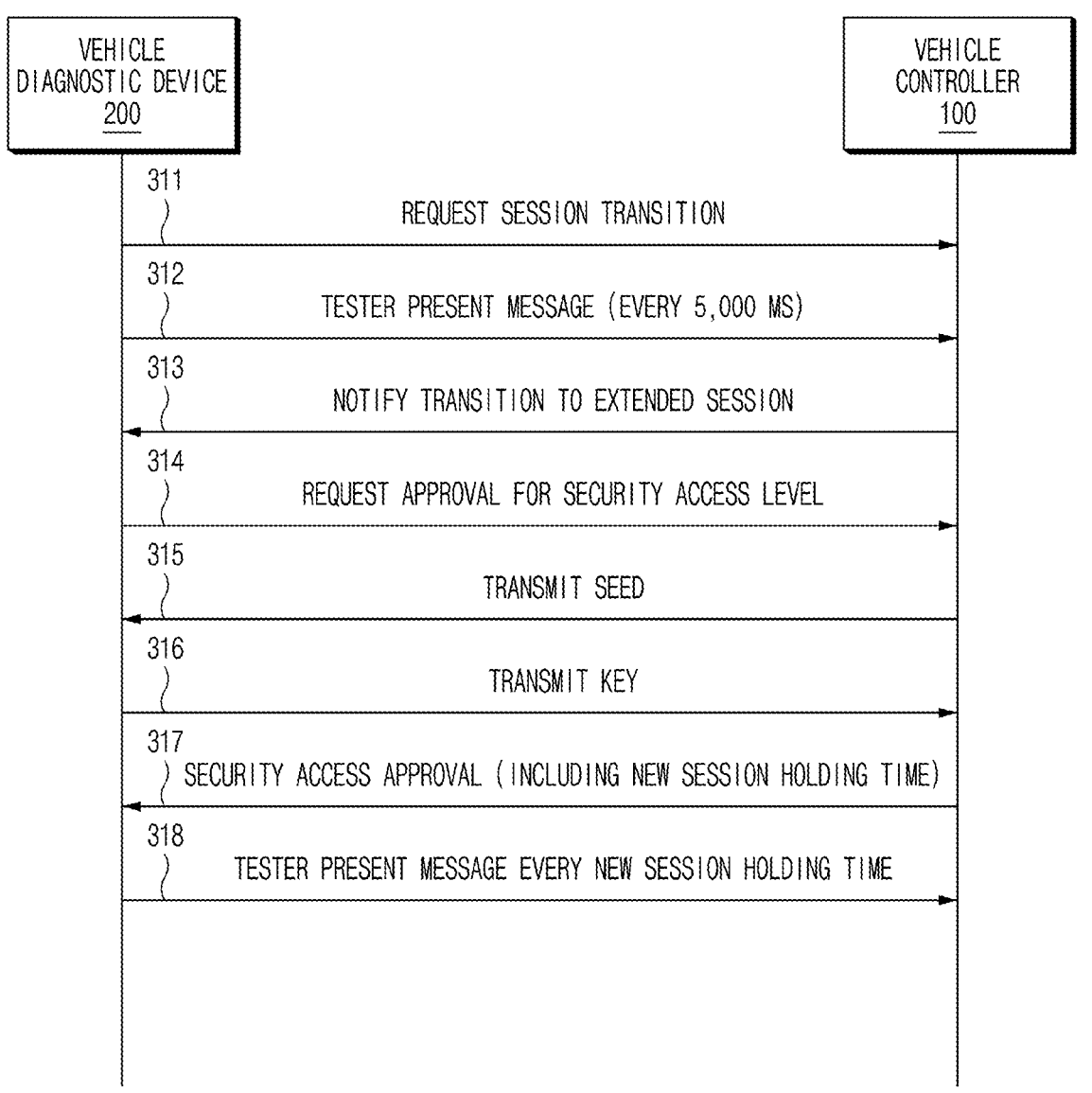
FIG. 3 is a diagram illustrating an example of a security access procedure between a vehicle diagnostic device and a vehicle controller.

FIG. 3 is a diagram illustrating an example of a security access procedure between a vehicle diagnostic device and a vehicle controller.

First, in 311, the vehicle diagnostic device 200 requests a session transition to the vehicle controller 100.

Thereafter, in 312, the vehicle diagnostic device 200 transmits a request message (e.g., a tester present message) to the vehicle controller 100 every session holding time (e.g., 5,000 ms) defined in the conventional technologies.

Thereafter, in 313, the vehicle controller 100 transitions from the default session 210 to the extended session 220, and notifies the vehicle diagnostic device 200 of the fact.

Thereafter, in 314, the vehicle diagnostic device 200 requests the vehicle controller 100 for approval for the security access level.

Then, in 315, the vehicle controller 100 transmits a seed for approval to the vehicle diagnostic device 200.

Thereafter, in 316, the vehicle diagnostic device 200 calculates a key corresponding to the seed and transmits the key to the vehicle controller 100.

Thereafter, in 317, the vehicle controller 100 transmits a message (hereinafter, referred to as an approval message) for approving the security access of the vehicle diagnostic device 200 to the vehicle diagnostic device 200. In some implementations, new session holding time information is recorded in the approval message.

Accordingly, in 318, the vehicle diagnostic device 200 transmits a request message (e.g., a tester present message) to the vehicle controller 100 every new session holding time.

FIG. 4 is a diagram illustrating an example of information recorded in an approval message.

As shown in FIG. 4, an approval message may include new session holding duration information 410. In some implementations, the "SecurityS3Server Time" may borrow the "STmin" value used in an existing unified diagnostic services (UDS) diagnostic request message as it is. However, as shown in FIG. 5, a new session holding time may be added to a reserved area.

FIG. 5 is a diagram illustrating an example of a "STmin" value table.

As shown in FIG. 5, values of 127 ms or less use F1 to F9 and 00 to 7F as they are, and allow S3Server timeout time up to 700 ms by using FA to FF values as a new session holding time.

Figure 6:
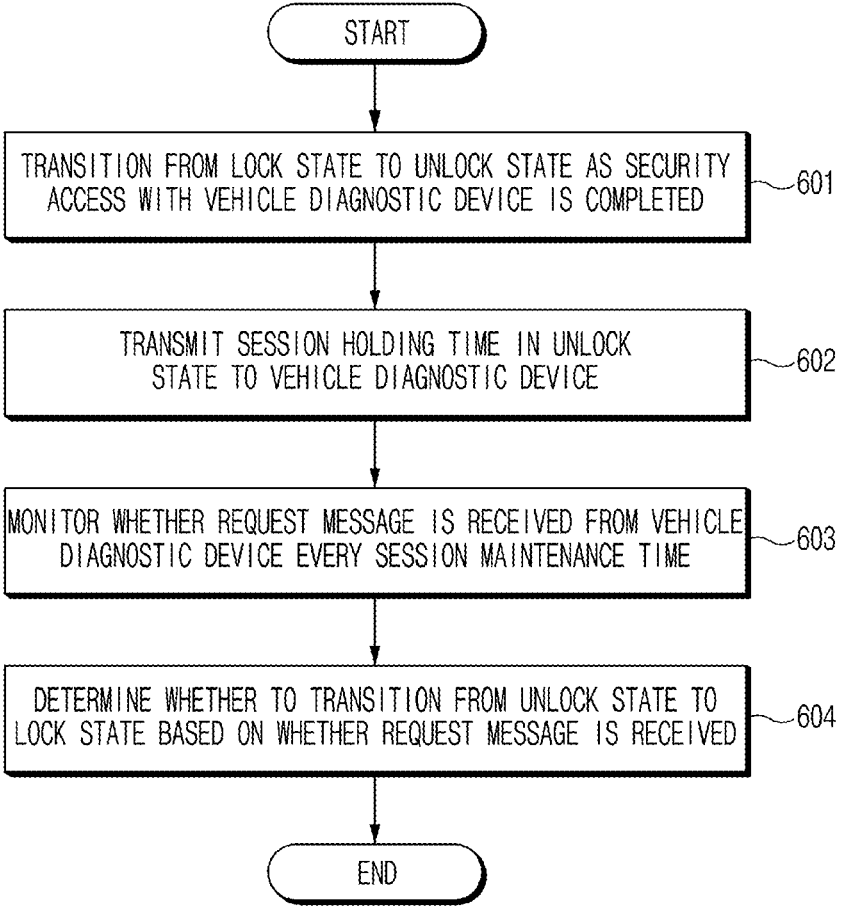
FIG. 6 is a flowchart illustrating an example of a session hijacking prevention method.

FIG. 6 is a flowchart illustrating an example of a session hijacking prevention method, and illustrates an example of a process performed by the vehicle controller 100.

First, in 601, the vehicle controller 100 transitions from the lock state to the unlock state as the security access with the vehicle diagnostic device 200 is completed.

Then, in 602, the vehicle controller 100 transmits the session holding time in the unlock state to the vehicle diagnostic device 200.

Thereafter, in 603, the vehicle controller 100 monitors whether a request message (e.g., a Tester Present message) is received from the vehicle diagnostic device 200 every session holding time.

Thereafter, in 604, the vehicle controller 100 determines whether to transition from the unlock state to the lock state based on whether the request message is received.

Figure 7:
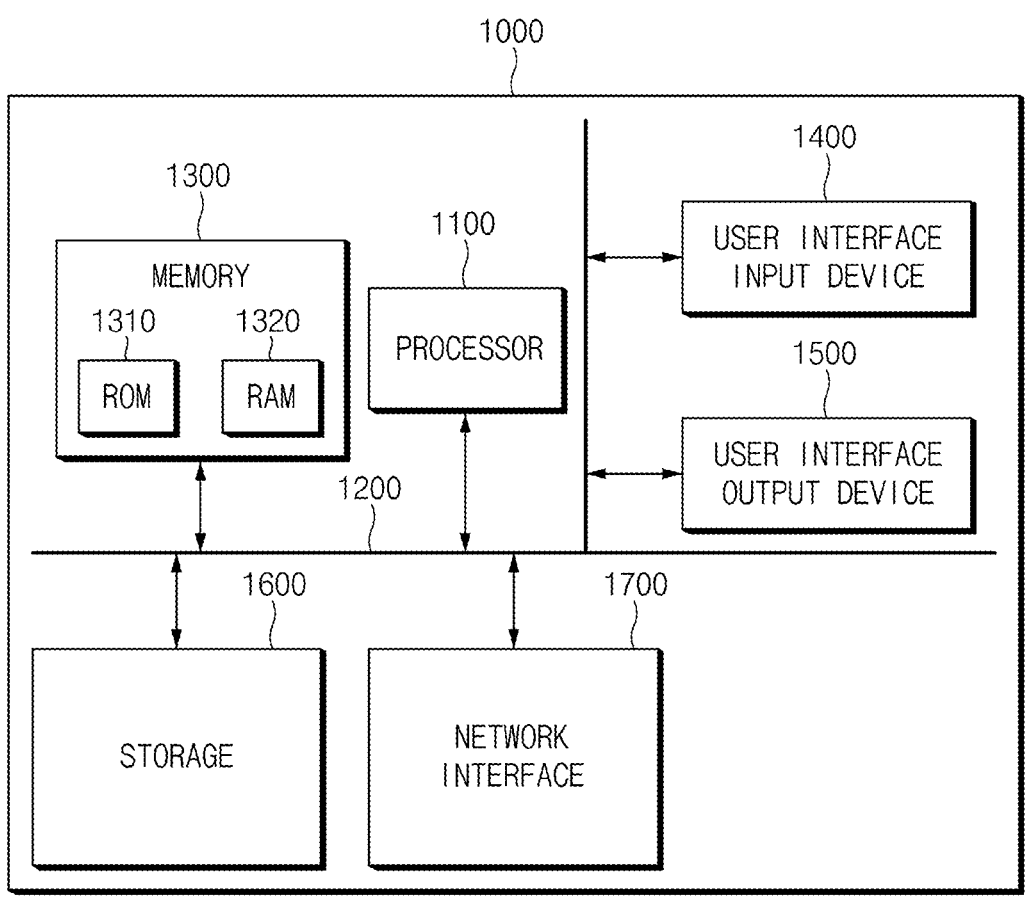
FIG. 7 is a block diagram illustrating an example of a computing system for executing a session hijacking prevention method.

FIG. 7 is a block diagram illustrating an example of a computing system for executing a session hijacking prevention method.

Referring to FIG. 7, a session hijacking prevention method may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

As described above, the method and system for preventing a vehicle controller from being hacked according to the embodiment of the present disclosure may transition from the lock state to the unlock state when the security access with the vehicle diagnostic device is completed, transmit a session holding time in the unlock state to the vehicle diagnostic device, monitor whether the request message is received from the vehicle diagnostic device every session holding time, and determine whether to transition from the unlock state to the lock state based on whether the request message is received, so that it is possible to prevent the session with the vehicle diagnostic device from being hijacked.

What is claimed is:

1. A method of preventing a vehicle controller from being hacked, the method comprising:

allowing the vehicle controller to transition from a lock state to an unlock state in response to a security access with a vehicle diagnostic device being completed within a first session holding time;

recording a second session holding time in a message for approving the security access of the vehicle diagnostic device, by the vehicle controller in the unlock state;

transmitting, to the vehicle diagnostic device, the message in which the second session holding time is recorded, by the vehicle controller in the unlock state;

monitoring, by the vehicle controller, whether a request message is received from the vehicle diagnostic device within the second session holding time; and determining, by the vehicle controller, whether to transition from the unlock state to the lock state based on receipt of the request message, wherein the second session holding time is set to be less than the first session holding time.

2. The method of claim 1, wherein determining the transition includes:

maintaining, based on the request message being received from the vehicle diagnostic device within the second session holding time, the unlock state; and transitioning, based on the request message not being received from the vehicle diagnostic device within the second session holding time, from the unlock state to the lock state.

3. The method of claim 1, wherein the vehicle controller is connected to a gateway provided in a vehicle.

4. The method of claim 1, wherein the vehicle diagnostic device is configured to perform a security access procedure with the vehicle controller through an on-board diagnostics (OBD) connector provided in a vehicle.

5. A system comprising:

a vehicle controller configured to:

allow transition from a lock state to an unlock state in response to a security access, with a vehicle diagnostic device being completed within a first session holding time, record, a second session holding time in a message for approving the security access of the vehicle diagnostic device, transmit, to the vehicle diagnostic device, the message in which the second session holding time is recorded, monitor whether a request message is received from the vehicle diagnostic device within the second session holding time, and determine whether to transition from the unlock state to the lock state based on receipt of the request message, wherein, the vehicle diagnostic device configured to:

receive, based on the security access with the vehicle controller being completed, the message in which the second session holding time is recorded from the vehicle controller, and transmit the request message to the vehicle controller within the second session holding time, wherein the second session holding time is set to be less than the first session holding time.

6. The system of claim 5, wherein the vehicle controller is configured to:

maintain, based on the request message being received from the vehicle diagnostic device within the second session holding time, the unlock state, and transition, based on the request message not being received from the vehicle diagnostic device within the second session holding time, from the unlock state to the lock state.

7. The system of claim 5, wherein the vehicle controller is connected to a gateway provided in a vehicle.

8. The system of claim 5, wherein the vehicle diagnostic device is configured to perform a security access procedure with the vehicle controller through an on-board diagnostics (OBD) connector provided in a vehicle.

* * * * *